US010111789B2

(12) United States Patent
McNally

(10) Patent No.: US 10,111,789 B2
(45) Date of Patent: Oct. 30, 2018

(54) WHEELCHAIR WHEEL WINDER

(71) Applicant: Simon S. McNally, Lancashire (GB)

(72) Inventor: Simon S. McNally, Lancashire (GB)

( * ) Notice: Subject to any disclaimer, the term of this patent is extended or adjusted under 35 U.S.C. 154(b) by 0 days.

(21) Appl. No.: 14/894,664

(22) PCT Filed: Jun. 10, 2014

(86) PCT No.: PCT/GB2014/000218
§ 371 (c)(1),
(2) Date: Nov. 30, 2015

(87) PCT Pub. No.: WO2014/199110
PCT Pub. Date: Dec. 18, 2014

(65) Prior Publication Data

US 2016/0250086 A1 Sep. 1, 2016

(30) Foreign Application Priority Data

Jun. 10, 2013 (GB) .................................. 1310245.4

(51) Int. Cl.
*B62M 1/14* (2006.01)
*A61G 5/02* (2006.01)
*A61G 5/10* (2006.01)

(52) U.S. Cl.
CPC ............. *A61G 5/026* (2013.01); *A61G 5/023* (2013.01); *A61G 5/025* (2013.01); *A61G 5/027* (2013.01); *A61G 5/1054* (2016.11)

(58) Field of Classification Search
CPC ......... A61G 5/026; A61G 5/025; A61G 5/027
USPC ......................................... 280/249, 243, 246
See application file for complete search history.

(56) References Cited

U.S. PATENT DOCUMENTS 4,354,691 A * 10/1982 Saunders ............... A61G 5/022 280/244
4,865,344 A * 9/1989 Romero, Sr. .......... A61G 5/023 280/255
5,020,818 A * 6/1991 Oxford .................. A61G 5/023 280/250.1
5,303,945 A * 4/1994 Oxford .................. A61G 5/023 280/244

(Continued)

FOREIGN PATENT DOCUMENTS

DE 34 13 312 A1 1/1986
DE 296 14 810 U1 10/1996
FR 2 928 537 A1 9/2009

OTHER PUBLICATIONS

International Search Report, dated Oct. 7, 2014, from International Phase of the instant application.

(Continued)

*Primary Examiner* — Tony H Winner
(74) *Attorney, Agent, or Firm* — Ingenium Patents LLC; Peter R. Kramer

(57) ABSTRACT

A manual wheelchair propulsion device (FIGS. 5, 6 & 7), attached to wheelchairs through the axles of the rear wheels (FIGS. 14, 15, 16 & 17), attached through the wheel winder unit with a quick release head with ball Joint to lock in position (FIGS. 1, 2) to an adaptable socket either manufactured into the axle of the wheelchair wheel or attached rigidly with supports later (FIGS. 14, 15 & 17) with a retractable arm (FIGS. 5 & 6) with eight gears and one neutral (FIGS. 3, 12 & 13) used in a circular motion to manually propel ones self.

4 Claims, 6 Drawing Sheets

(56) References Cited

U.S. PATENT DOCUMENTS

| | | | | |
|---|---|---|---|---|
| 6,634,663 | B2 * | 10/2003 | Mitchell | A61G 5/022<br>280/250.1 |
| 6,755,430 | B1 * | 6/2004 | Watwood | A61G 5/023<br>280/246 |
| 7,261,309 | B2 * | 8/2007 | Watwood | A61G 5/023<br>280/244 |

OTHER PUBLICATIONS

International Search Report, dated Oct. 22, 2014, from International Phase of the instant application.

* cited by examiner

WHEELCHAIR WHEEL WINDER

This Invention is a hand propulsion device to be fitted to the axle of the majority of wheelchairs on the market around the world today Many wheelchairs today are self propelled by the means of a hand rail surrounding the outer rim of the wheelchair wheel. This can be hard work on hills or long journeys. Alternatively, this can also be difficult on a person's arms, shoulders and elbow joints.

Many of the wheelchair propulsion devices on the market today are of the push and pull configuration, which all extend past the wheel and tyre rims of the wheelchairs where your arms are pushed to full extension and pulled back towards your stomach and chest.

This invention is for an alternative manual means of wheelchair propulsion which is attached to the rear large wheels axle of wheelchairs and driven by means of pressure onto a handle in circular motions within the outer rims of the wheelchair wheels. This device, the wheel winder is extendable to the outer wheel rim as well as retractable to be close to the wheels axle, also with gearing so a number of methods of pressure for propulsion can be used. This also would be used by means to slow a person down using the wheel winder attached to a wheelchair. A pawl switch is attached for forward rotation, rear rotation, locked position & neutral.

The wheelchair hand wheel winder which is fitted to the axle of both large rear wheels of wheelchairs, Is either fitted into place at manufacture at the axle, as a socket where the wheel winder can be fitted and detached quickly by ball joint quick release mechanism, or as an attachment to the axle and surrounding area making the socket sturdy fit to the outer axle, this will show no movement whatsoever so as not to buckle or damage the spokes or relevant wheel design that is in place. Then the wheel winder simply slots into the socket of the wheelchairs wheel, locking into position and released if needed to.

The wheel winder manual wheelchair propulsion device will now be described with in figures to match artwork with full description afterwards.

FIGURES

Figure 1:
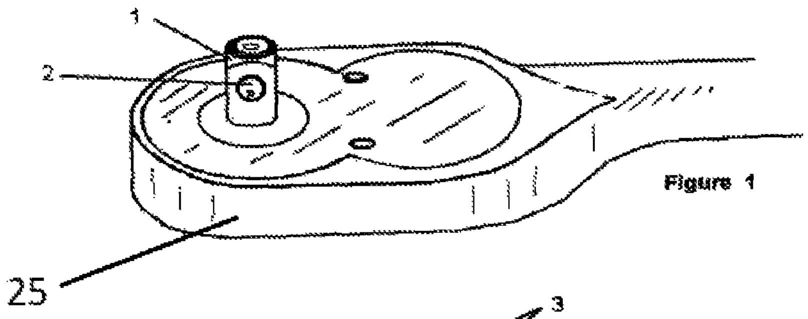

FIG. 1—The Wheel Winder Main base unit showing the mechanism head of the unit to fit a socket which would be attached to the axle of the wheelchairs wheels.

Figure 2:
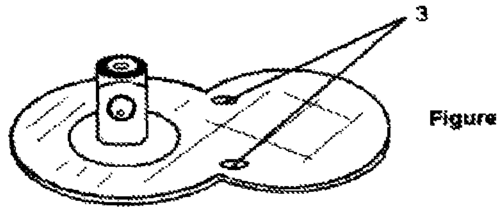

FIG. 2—The Wheel Winder Top of the main unit open.

Figure 3:
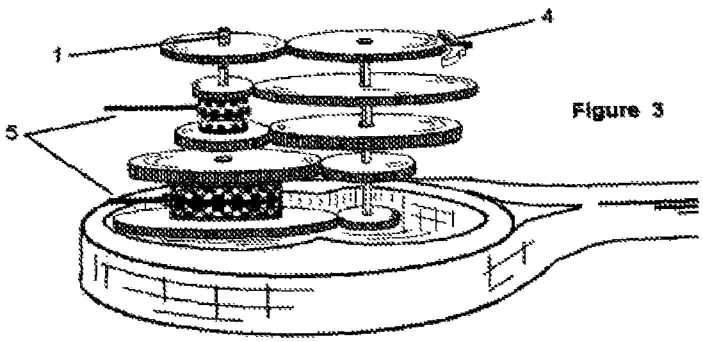

FIG. 3—The Wheel Winder opened unit showing Gearing system mechanism.

Figure 4:
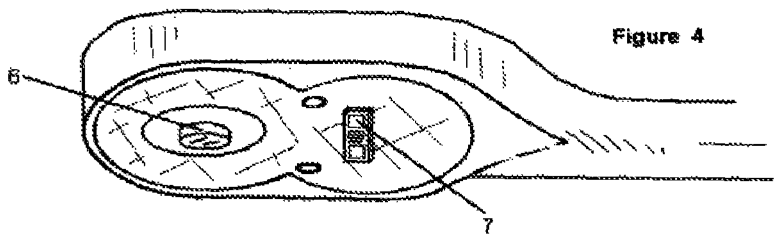

FIG. 4—The Wheel Winder Base unit turned over, showing the quick release button & pawl switch for forward and rear rotation, also a neutral if so needed.

Figure 5:
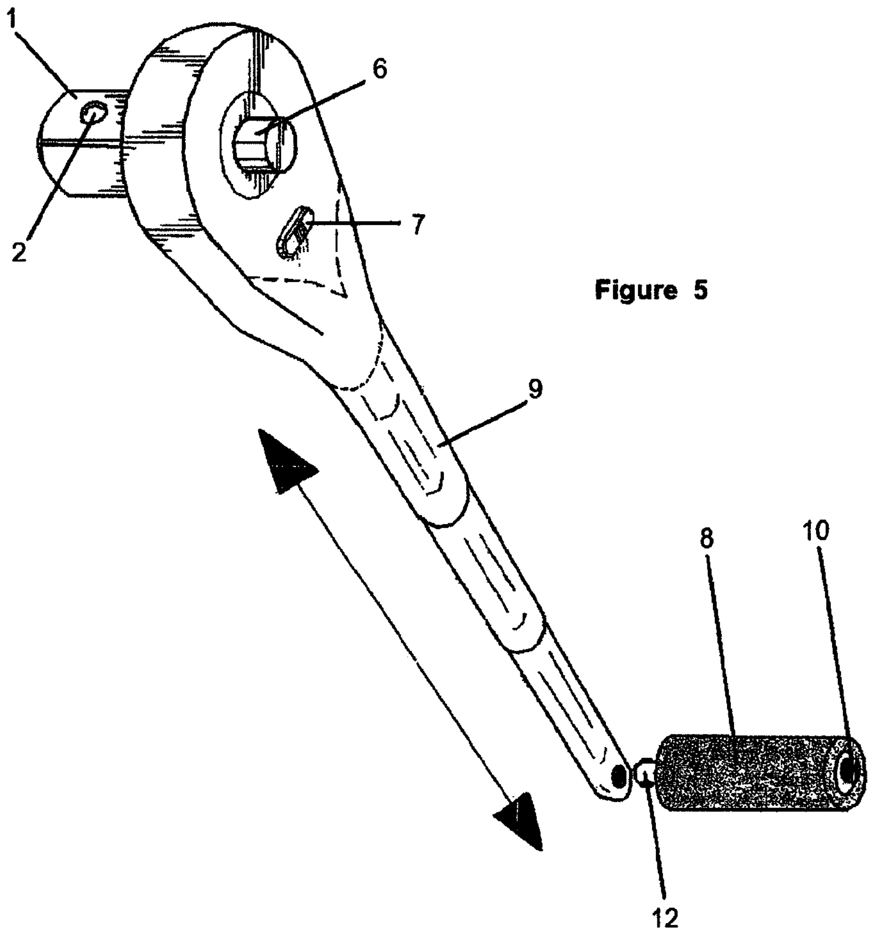

FIG. 5—The Wheel Winder Extended showing full unit with handle.

Figure 6:
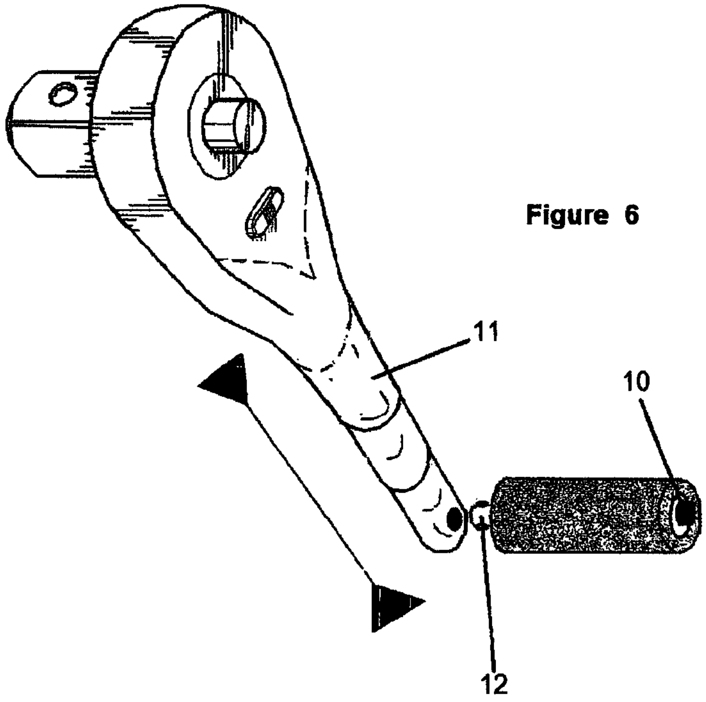

FIG. 6—The Wheel Winder Retracted showing full unit with handle.

Figure 7:
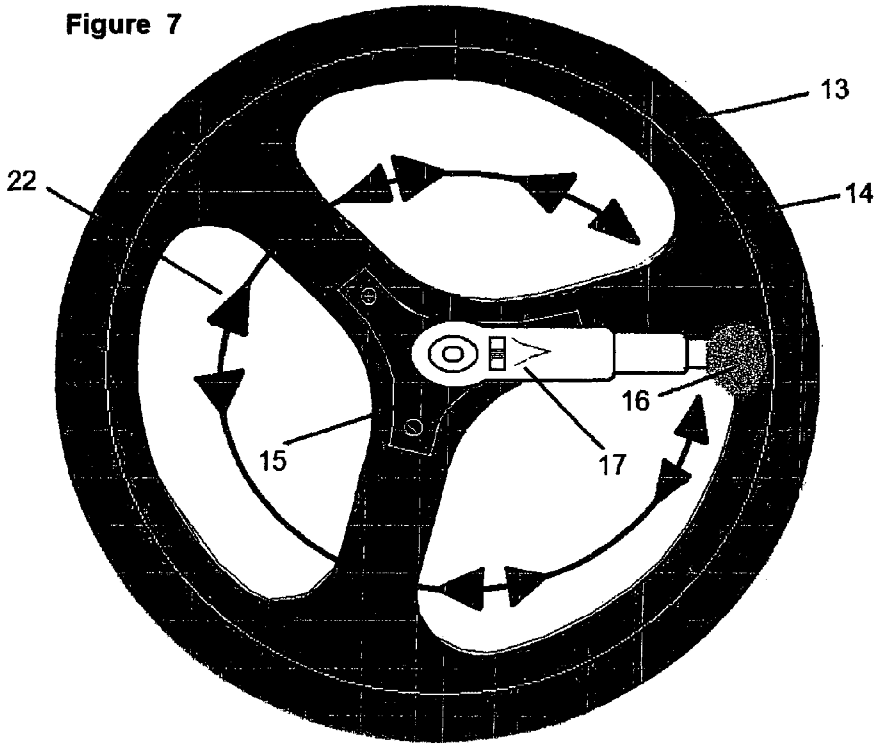

FIG. 7—The Wheel Winder Attached to a wheelchair wheel at a side glance, showing directions the wheel winder will go in.

Figure 8:

FIG. 8—The Wheel Winder Side Glance Retracted.

Figure 9:
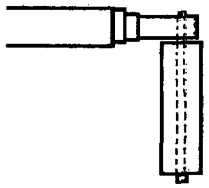

FIG. 9—The Wheel Winder Look From Above Retracted.

Figure 10:

FIG. 10—The Wheel Winder Side Glance Extended.

Figure 11:
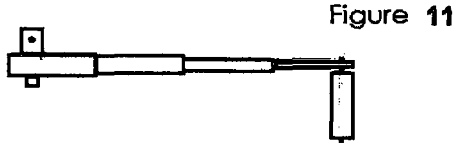

FIG. 11—The Wheel Winder Look From Above Extended.

Figure 12:
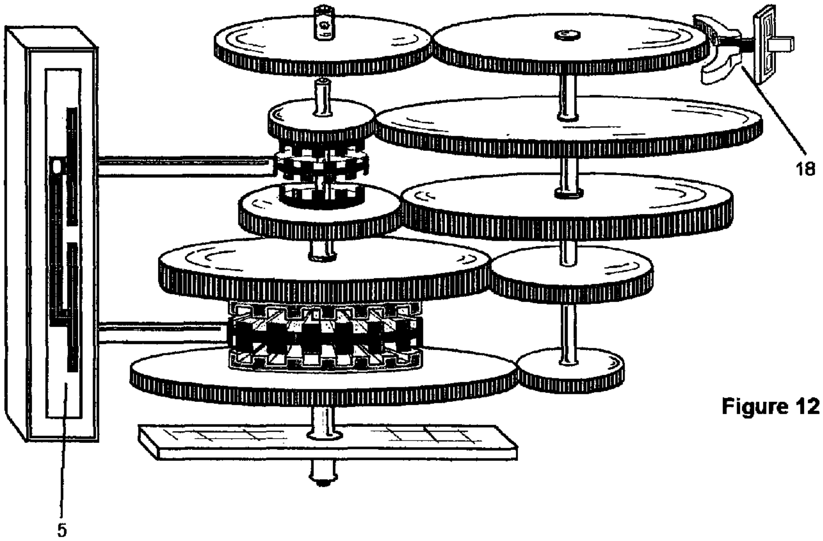

FIG. 12—The Wheel Winder Gearing Side View & gearbox attached to the outside to the side of the main unit.

Figure 13:
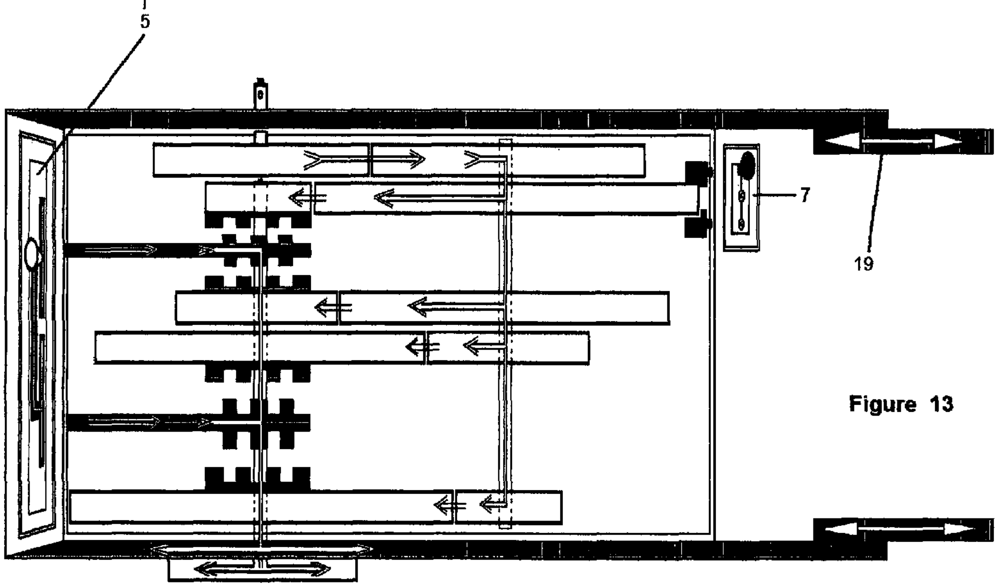

FIG. 13—The Wheel Winder Gearing from above with gearbox.

Figure 14:
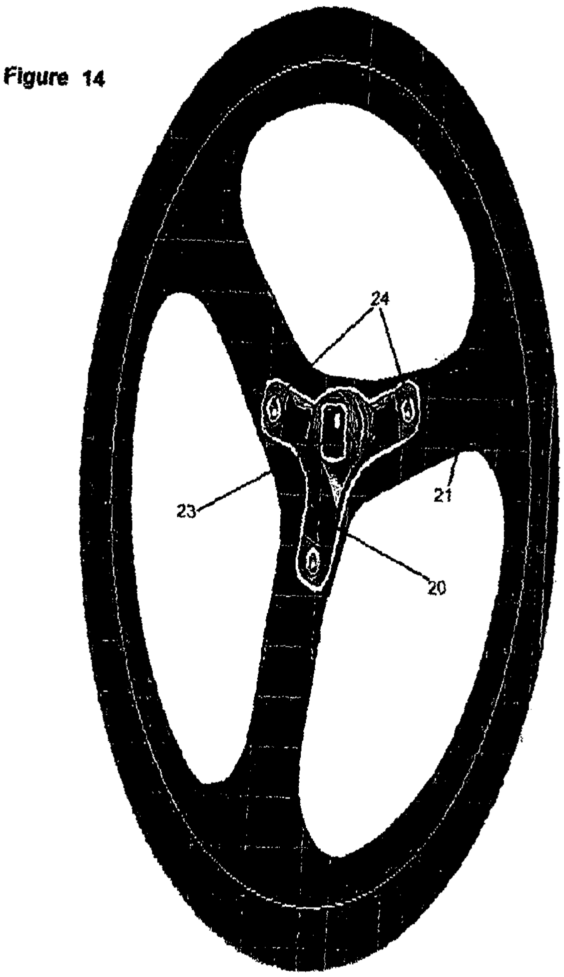

FIG. 14—The Wheelchair Wheel with additional socket attachment fitted.

Figure 15:
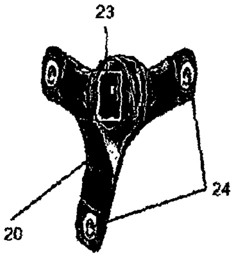

FIG. 15—A Socket Attachment, one of the many of the socket attachments which can be fitted to the wheelchair wheel.

Figure 16:
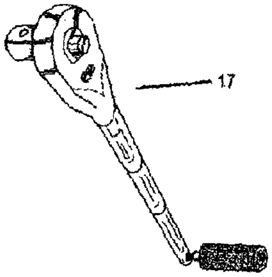

FIG. 16—The Wheel Winder full unit.

Figure 17:
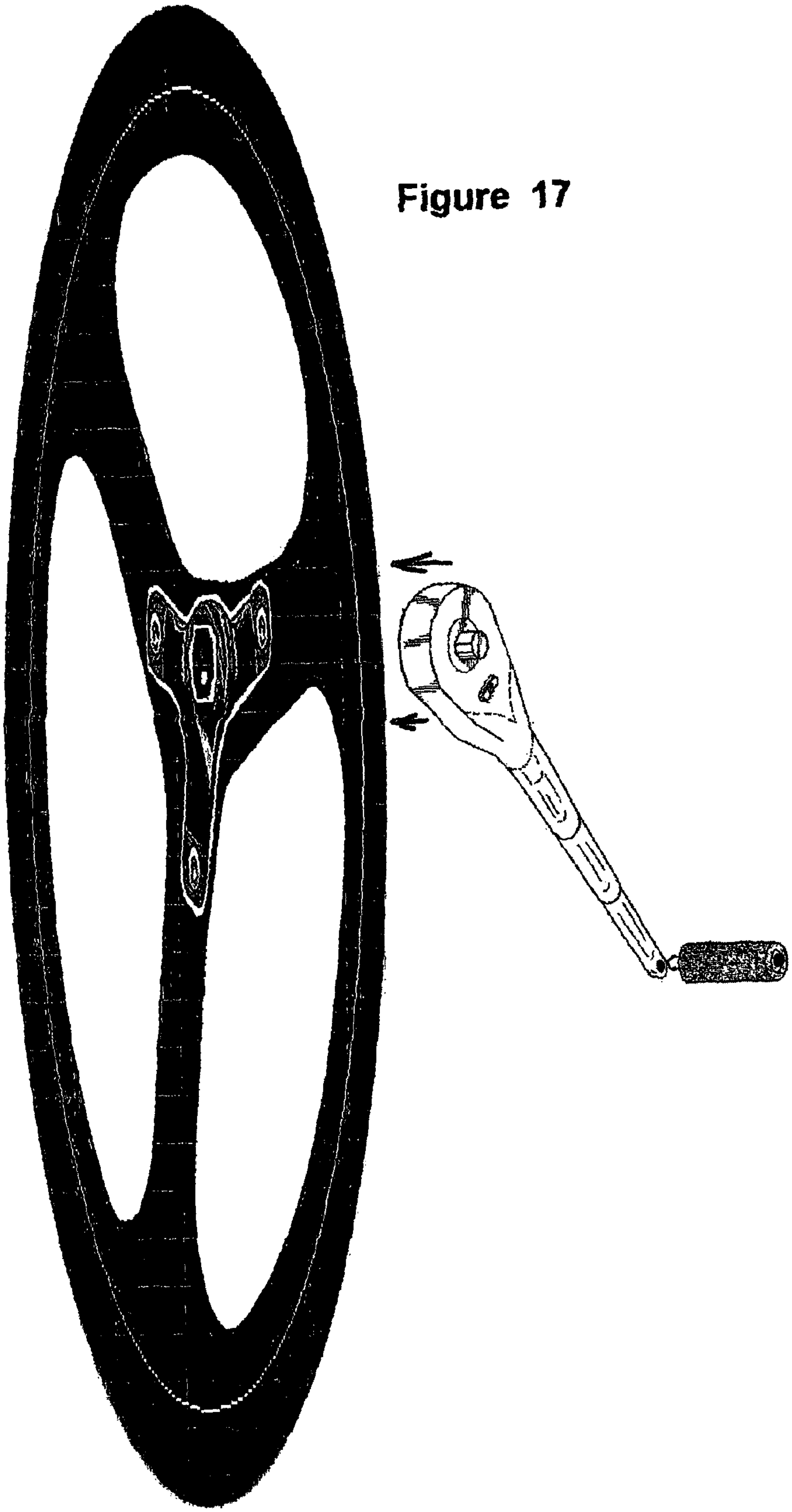

FIG. 17—The Wheel Winder the socket head & wheelchair wheel with socket fitted showing how they would look attached to one another.

NUMBERED POINTS

1—The wheel winder mechanism head to fit sockets fitted to the outside axles of large wheels of wheelchairs.

2—The ball bearing to keep the wheel winder head unit mechanism in place when fitted to a socket.

3—The screws placements to tighten up the wheel winder unit.

4—Spring loaded Pawl on the wheel winder mechanism to shift from forwards to backwards, locked position & neutral.

5—The arm & of the gears of the wheel winder that is attached to a switch on the outside side of the wheel winder which controls a total of 8 gears, a locked position and one neutral also using the pawl.

6—A button when pressed, releases the wheel winder from a socket which would be attached to the axle of the large wheel of a wheelchair.

7—Pawl switch, forward rotation, rear rotation, locked position & neutral.

8—A soft grip handle to enable the user of the wheel winder to propel ones self by holding onto and rotating the wheel winder in circular motions around the rotation area of the wheelchair wheel.

9—An Extended wheel winder which easily pulls out & locks into desired position by twisting the handle.

10—A button on the end of the handle which releases from the main body of the wheel winder arm either to be replaced or to fit easier through doorways. Also the full unit can be detached if so desired (see 1,2)

11—A Retracted wheel winder which easily retracts & locks into desired position by twisting the handle.

12—The joint release arm for the handle to attach or detach the main arm of the wheel winder.

13—Wheelchair tyre.

14—Body of the rim of the wheelchair wheel.

15—A possible way of attaching the wheel winder to a wheelchair wheel, when no socket can be attached to the axle of the wheelchairs wheel.

16—The handle of the wheelchair winder.

17—The wheel winder full unit which is to be attached to the outer axle of a large wheel of a wheelchair.

18—The spring loaded pawl & switch, where the switch would be located on the outside of the wheel winders main body. Showing lock forwards, lock backwards, lock all and neutral.

19—An opened look at the retractable & extendable arm of the wheel winder

20—A possible attachment to the wheelchair wheel, if a socket cannot be fitted directly into the axle to enable the wheel winder to slot into.

21—Body of the rim of the wheelchair wheel.

22—Directional Rotation of the wheel winder attached to the outer axle of a wheelchair.

23—The socket for the wheel winder to attach to

24—Bolts to affixes the socket body to the wheelchair wheel surrounding the axle, to ensure sturdy fit with no movement if no socket can be fitted to the wheelchair axle.

25—Gearbox housing

FULL DESCRIPTION

The wheelchair hand wheel winder which is fitted to a socket attached to the outside axles of both large rear wheels of wheelchairs by means, Is either fixed into place at manufacture at the axle, as a socket where the wheel winder can be fitted and detached quickly by ball joint quick release mechanism, which is fitted to the head of the wheel winder. Or as an attachment to the axle and surrounding area making the socket sturdy fit to the outer axle, this will show no movement whatsoever so as not to buckle or damage the spokes or relevant wheel design that is in place. Then the wheel winder simply slots into the socket of the wheelchairs wheel, locking into position and released if needed to.

The wheel winder head can then slotted and locked into place into the axle socket which is attached to the wheelchairs wheels and removed easily by pressing a release button on the wheel winders main unit.

The wheel winder works by moving the handle by means of circular motion around the axle of the wheelchair, rotating the wheel winder handle in a circular motion in a forwards or rearwards direction with the switch of a pawl to suit direction and if so wished there is a total of eight gears plus one locked and one neutral to suit ones self.

The wheel winder arm and handle are extendable and retractable from near to the wheelchair wheel axle when fully retracted to fully opened, which is at the rim of the wheelchair wheel. It is designed to go no further so when not in use, it will not hit the floor on rotations potentially putting the wheelchair on its side. The handle & arm, extends & retracts within itself.

When you would like to move the handles location on the arm, the handle is extended and retracted by twisting the handle upwards, so as to be flush with the wheelchair wheel, then extended or retracted to your desired location.

There are also many combinations to retract and expand the arm, combined with the 8 gears system should always have a good possible gear & arm location to use to be comfortable to progress for longer distances which can also be used to slow ones self down.

The hand pedals gearing can also be altered easily by pressing and moving a lever, located at the main wheel winder unit on the side. This has 4 different locations to lock the gears into desired position. Then the pawl is switched to either forward, backwards, neutral or in the locked position. Then the position of the arm can be altered to your own desired location, retraction up to the axle area for rotation or pulling the arm out which extends the arm to maximum extension which is at wheelchairs wheel rim and moving the hand pedal handle to another location will alter to how much force is needed for propulsion of your wheelchair.

The hand pedal handle itself has to be free moving, so can rotate easily on the handle which can be made of many designs or shapes to suit people's hands. One of the options is a tough sponge, such as in diagrams, so a good grip can be obtained of the wheelchair wheel winder.

The quick release system for the wheelchair wheel winder can be used easily. A quick release button on the head of the wheel winder has a button which when simply pressed and pulling of the wheel winder will detach the wheel winder from the axle of the wheelchairs wheel. This is needed to enable easy access through doorways and simple access to quick release wheelchair wheels so they can also be detached and transported in vehicles to be used elsewhere. By this there is a pawl switch which switches the drive from forward to rear rotation, locked or neutral if so wished. The handle also has a quick release to enable the person to also go through tighter spaces and renew the handle when it is worn down or broken.

The wheel winder full unit which is to be attached to the outer axle of a large wheel of a wheelchair by means of a socket Which is attached to the wheelchairs axle, and the head of the unit, which is built into the wheel winder to fit the socket attached to the axle The basic design of a wheelchair hand pedal which is connected to the axle of the large wheels of a wheelchair is the design and principle invention and can come in all shapes and sizes and designs but the overall principle is the same as a geared, quick release retractable circular motion wheelchair propulsion apparatus.

The invention claimed is:

1. A wheelchair hand pedal manual propulsion device that attaches to a wheelchair wheel comprising:

a gearbox comprised of a gearbox housing and a plurality of gears configured for speed changing, said plurality of gears encased in said gearbox housing, said gearbox further comprising a drive member that is integrally formed with said housing, a telescoping hand pedal arm with a first end and a second end, said second end opposite to said first end, wherein said gearbox housing is affixed to said first end, a pawl and a pawl switch to shift from a forward to backward position with a locked position and a neutral position, said pawl switch located on an exterior surface of said gearbox housing, a lever to change gears, a detachable handle, said detachable handle positioned at said second end of said hand pedal arm, a socket attachment, said socket attachment being attachable at an axis of the wheelchair wheel, said socket attachment configured to receive said drive member such that torque from said drive member is transmitted to said wheelchair wheel, a first quick release mechanism to detach said drive member from said socket, wherein said gearbox and said drive member are detached from the wheel when said drive member is detached from said socket.

2. The wheelchair hand pedal manual propulsion device of claim 1 further comprising:

an arrangement wherein said detachable handle extends outward at a right angle to said hand pedal arm, a second quick release mechanism to quickly detach said detachable handle from said hand pedal arm.

3. The wheelchair hand pedal manual propulsion device of claim 2 further comprising wherein said first quick release mechanism attaches and reattaches the drive member to the socket by push of a button on the gearbox housing.

4. The wheelchair hand pedal manual propulsion device of claim 3 further comprising wherein said drive member further comprises a ball bearing, said ball bearing further comprising said first quick release mechanism.

* * * * *